United States Patent
Baldi (10) Patent No.: US 11,465,878 B2
(45) Date of Patent: Oct. 11, 2022

(54) VISUAL STATUS INDICATOR FOR DOOR AND LOCK STATE

(71) Applicant: Otis Elevator Company, Farmington, CT (US)

(72) Inventor: Emily Baldi, East Hartford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 539 days.

(21) Appl. No.: 15/475,643

(22) Filed: Mar. 31, 2017

(65) Prior Publication Data

US 2018/0282117 A1    Oct. 4, 2018

(51) Int. Cl.

| | | |
|---|---|---|
| *B66B 13/14* | (2006.01) | |
| *B66B 13/02* | (2006.01) | |
| *B66B 5/00* | (2006.01) | |
| *B66B 5/02* | (2006.01) | |
| *B66B 3/00* | (2006.01) | |
| *B66B 13/16* | (2006.01) | |
| *G05B 19/04* | (2006.01) | |
| *G05B 19/042* | (2006.01) | |

(52) U.S. Cl.
CPC ............. *B66B 3/002* (2013.01); *B66B 5/025* (2013.01); *B66B 13/165* (2013.01); *G05B 19/041* (2013.01); *G05B 19/042* (2013.01); *G05B 2219/2642* (2013.01); *G05B 2219/45242* (2013.01)

(58) Field of Classification Search
CPC ....... B66B 3/002; B66B 5/025; B66B 13/165; B66B 13/00; B66B 13/16; B66B 5/0018; B66B 13/02; B66B 13/14; G05B 19/041; G05B 19/042

USPC ........ 187/247, 248, 313, 316, 317, 391, 393
See application file for complete search history.

(56) References Cited

U.S. PATENT DOCUMENTS

| | | | | |
|---|---|---|---|---|
| 3,973,648 A | * | 8/1976 | Hummert | B66B 5/0006 187/393 |
| 4,512,442 A | * | 4/1985 | Moore | B66B 5/0006 187/393 |
| 4,568,909 A | | 2/1986 | Whynacht | |
| 5,290,975 A | | 3/1994 | Mizuno et al. | |
| 5,760,350 A | * | 6/1998 | Pepin | B66B 13/143 187/316 |

(Continued)

FOREIGN PATENT DOCUMENTS

| | | |
|---|---|---|
| CN | 1061944 A | 6/1992 |
| CN | 2833666 Y | 11/2006 |

(Continued)

OTHER PUBLICATIONS

Garfield, Leanna, "This app lets you open doors and summon elevators with your phone", Business Insider, May 19, 2016, http://www.businessinsider.com/myport-smartphone-app-opens-doors-and-summons-elevators-2016-5, 2pgs.

(Continued)

*Primary Examiner* — Christopher Uhlir
(74) *Attorney, Agent, or Firm* — Cantor Colburn LLP (57) ABSTRACT

A method of controlling building systems including detecting a status parameter of a door of a building; displaying the status parameter of the door on a device; detecting a status parameter of a door lock, the door lock being operbly connected to the door; and displaying the status parameter of the door and the status parameter of the door lock on a device.

14 Claims, 5 Drawing Sheets

(56) References Cited

U.S. PATENT DOCUMENTS

| | | | |
|---|---|---|---|
| 5,894,911 A * | 4/1999 | Bozorgzadeh | B66B 13/185 187/335 |
| 6,330,935 B1 * | 12/2001 | Systermans | B66B 5/0025 187/391 |
| 6,364,066 B1 * | 4/2002 | Bolch | B66B 5/0018 187/391 |
| 6,604,611 B2 * | 8/2003 | Liu | B66B 5/0025 187/247 |
| 7,073,633 B2 * | 7/2006 | Weinberger | B66B 5/0025 187/393 |
| 7,190,256 B2 * | 3/2007 | Pieper | B66B 1/468 340/5.2 |
| 7,419,032 B2 * | 9/2008 | Yamakawa | B66B 1/34 187/247 |
| 7,699,142 B1 * | 4/2010 | Wurth | B66B 5/0025 187/247 |
| 8,028,807 B2 * | 10/2011 | Deplazes | B66B 5/0025 187/391 |
| 8,151,942 B2 | 4/2012 | Rusanen et al. | |
| 8,490,754 B2 * | 7/2013 | Amano | B66B 1/2458 187/384 |
| 8,744,754 B2 | 6/2014 | Kappeler et al. | |
| 8,857,569 B2 * | 10/2014 | Friedli | B66B 5/0012 187/384 |
| 8,967,335 B2 * | 3/2015 | Friedli | B66B 1/2458 187/247 |
| 9,053,587 B2 | 6/2015 | Alnadwi | |
| 9,057,210 B2 | 6/2015 | Dumas et al. | |
| 9,108,824 B2 * | 8/2015 | Hughes | B66B 1/34 |
| 9,109,379 B1 | 8/2015 | Ranchod | |
| 9,165,123 B1 * | 10/2015 | Mallard | G06F 21/31 |
| 9,245,439 B2 * | 1/2016 | Lamb | G08B 13/02 |
| 9,390,572 B2 | 7/2016 | Almomani | |
| 9,449,444 B2 | 9/2016 | Kim et al. | |
| 9,524,601 B1 | 12/2016 | Dumas | |
| 9,557,719 B2 | 1/2017 | Liu et al. | |
| 9,574,375 B2 | 2/2017 | Henderson | |
| 9,580,276 B2 * | 2/2017 | Toutaoui | B66B 1/3461 |
| 9,802,788 B2 * | 10/2017 | Miyajima | B66B 1/468 |
| 9,802,789 B2 * | 10/2017 | Kim | B66B 5/0012 |
| 9,948,477 B2 * | 4/2018 | Marten | G05B 15/02 |
| 9,990,786 B1 * | 6/2018 | Ziraknejad | G07C 9/00103 |
| 10,091,017 B2 * | 10/2018 | Landow | H04L 12/2816 |
| 10,264,433 B2 * | 4/2019 | Ahearn | H04W 12/06 |
| 10,354,011 B2 * | 7/2019 | Nell | G10L 15/22 |
| 10,362,350 B2 * | 7/2019 | Lamb | H04N 7/18 |
| 10,488,833 B2 * | 11/2019 | Palmer | H04L 12/2816 |
| 2004/0267385 A1 | 12/2004 | Lingemann | |
| 2007/0219645 A1 | 9/2007 | Thomas et al. | |
| 2013/0048436 A1 * | 2/2013 | Chan | B66B 1/2408 187/387 |
| 2013/0335193 A1 | 12/2013 | Hanson et al. | |
| 2014/0145823 A1 | 5/2014 | Aase | |
| 2014/0150502 A1 | 6/2014 | Duncan | |
| 2015/0048927 A1 | 2/2015 | Simmons | |
| 2016/0009525 A1 | 1/2016 | Depaola et al. | |
| 2016/0018805 A1 | 1/2016 | Kuoppala et al. | |
| 2016/0096706 A1 | 4/2016 | Tang | |
| 2016/0307380 A1 | 10/2016 | Ho et al. | |
| 2018/0215579 A1 * | 8/2018 | Knecht | B66B 5/0031 |

FOREIGN PATENT DOCUMENTS

| | | |
|---|---|---|
| CN | 102015504 A | 4/2011 |
| CN | 103449276 A | 12/2013 |
| CN | 104163369 A | 11/2014 |
| CN | 204406505 U | 6/2015 |
| CN | 105051795 A | 11/2015 |
| CN | 303932067 S | 3/2016 |
| CN | 106097526 A | 11/2016 |
| CN | 303949335 S | 11/2016 |
| CN | 303996782 S | 1/2017 |
| CN | 205918240 U | 2/2017 |
| WO | 2013055346 A1 | 4/2013 |
| WO | 2014116182 A1 | 7/2014 |
| WO | 2014178790 A1 | 11/2014 |
| WO | 2016085529 A1 | 6/2016 |
| WO | 2016089932 A1 | 6/2016 |
| WO | 2016130386 A1 | 8/2016 |

OTHER PUBLICATIONS

Weiser, "Meet The Kevo App for Kevo Smart Lock—Weiser", accessed Mar. 30, 2017, http://www.weiserlock.com/en/kevo/application, Spectrum Brands Inc. 2016, 11 pgs.

Whitwam, Ryan, "Lockitron is Back With a $149 Kit That Allows You to Unlock Your Door With a Phone", http://www.androidpolice.com/2012/10/02/lockitron-is-back-with-a-kit-that-allows-smartphones-to-control-dumb-locks/, Oct. 2, 2012,5 pgs.

Extended European Search Report for Application No. 18164881.7-1017; Report dated Aug. 10, 2018 Report Received Date: Aug. 30, 2018; 8 pages.

European Office Action for European Application No. 18 164 881.7 filed on Mar. 29, 2018; dated Jun. 23, 2020; 26 pages.

* cited by examiner

VISUAL STATUS INDICATOR FOR DOOR AND LOCK STATE

BACKGROUND

The subject matter disclosed herein generally relates to the field of building system controls, and more particularly to an apparatus and method for monitoring the status of building systems through a device.

Building systems typically require physical examination of the actual system in order to detect the status of the system and if there are any errors in the system.

BRIEF SUMMARY

According to one embodiment, a method of controlling building systems is provided. The method comprising: detecting a status parameter of an elevator door; and displaying the status parameter of the elevator door on a device.

In addition to one or more of the features described above, or as an alternative, further embodiments of the method may include: detecting a status parameter of a first door; and displaying the status parameter of the first door on the device In addition to one or more of the features described above, or as an alternative, further embodiments of the method may include: detecting a status parameter of a first door lock, the first door lock being operably connected to the first door; and displaying the status parameter of the first door lock on the device.

In addition to one or more of the features described above, or as an alternative, further embodiments of the method may include: receiving a status parameter adjustment command for the first door lock; and adjusting the first door lock in response to the status parameter adjustment command.

In addition to one or more of the features described above, or as an alternative, further embodiments of the method may include engaging the first door lock.

In addition to one or more of the features described above, or as an alternative, further embodiments of the method may include disengaging the first door lock.

In addition to one or more of the features described above, or as an alternative, further embodiments of the method may include: receiving a status parameter adjustment command for the first door; and adjusting the first door in response to the status parameter adjustment command.

In addition to one or more of the features described above, or as an alternative, further embodiments of the method may include where the adjusting further comprises: closing the first door.

In addition to one or more of the features described above, or as an alternative, further embodiments of the method may include where the adjusting further comprises: opening the first door.

In addition to one or more of the features described above, or as an alternative, further embodiments of the method may include activating an alert in response to the at least one of the status parameter of the first door and the status parameter of the first door lock, wherein the alert is activated on the device.

In addition to one or more of the features described above, or as an alternative, further embodiments of the method may include closing the elevator door in response to the at least one of the status parameter of the first door and the status parameter of the first door lock.

In addition to one or more of the features described above, or as an alternative, further embodiments of the method may include closing a second door in response to the at least one of the status parameter of the first door and the status parameter of the first door lock.

In addition to one or more of the features described above, or as an alternative, further embodiments of the method may include engaging a second door lock in response to the at least one of the status parameter of the first door and the status parameter of the first door lock, wherein the second door lock is operably connected to the second door.

In addition to one or more of the features described above, or as an alternative, further embodiments of the method may include engaging a second door lock in response to the at least one of the status parameter of the first door and the status parameter of the first door lock, wherein the second door lock is operably connected to the second door.

In addition to one or more of the features described above, or as an alternative, further embodiments of the method may include disengaging a second door lock in response to the at least one of the status parameter of the first door and the status parameter of the first door lock, wherein the second door lock is operably connected to a second door.

In addition to one or more of the features described above, or as an alternative, further embodiments of the method may include opening the second door in response to the at least one of the status parameter of the first door and the status parameter of the first door lock.

In addition to one or more of the features described above, or as an alternative, further embodiments of the method may include opening a second door in response to the at least one of the status parameter of the first door and the status parameter of the first door lock.

In addition to one or more of the features described above, or as an alternative, further embodiments of the method may include the status parameter displays as at least one of text and a graphic.

According to an embodiment, a building control system comprising: a processor; a memory comprising computer-executable instructions that, when executed by the processor, cause the processor to perform operations, the operations comprising: detecting a status parameter of an elevator door; and displaying the status parameter of the elevator door on a device.

According to an embodiment, a computer program product tangibly embodied on a computer readable medium, the computer program product including instructions that, when executed by a processor, cause the processor to perform operations comprising: detecting a status parameter of an elevator door; and displaying the status parameter of the elevator door on a device.

Technical effects of embodiments of the present disclosure include the ability monitor a door status and a door lock status through a user interface on a device.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
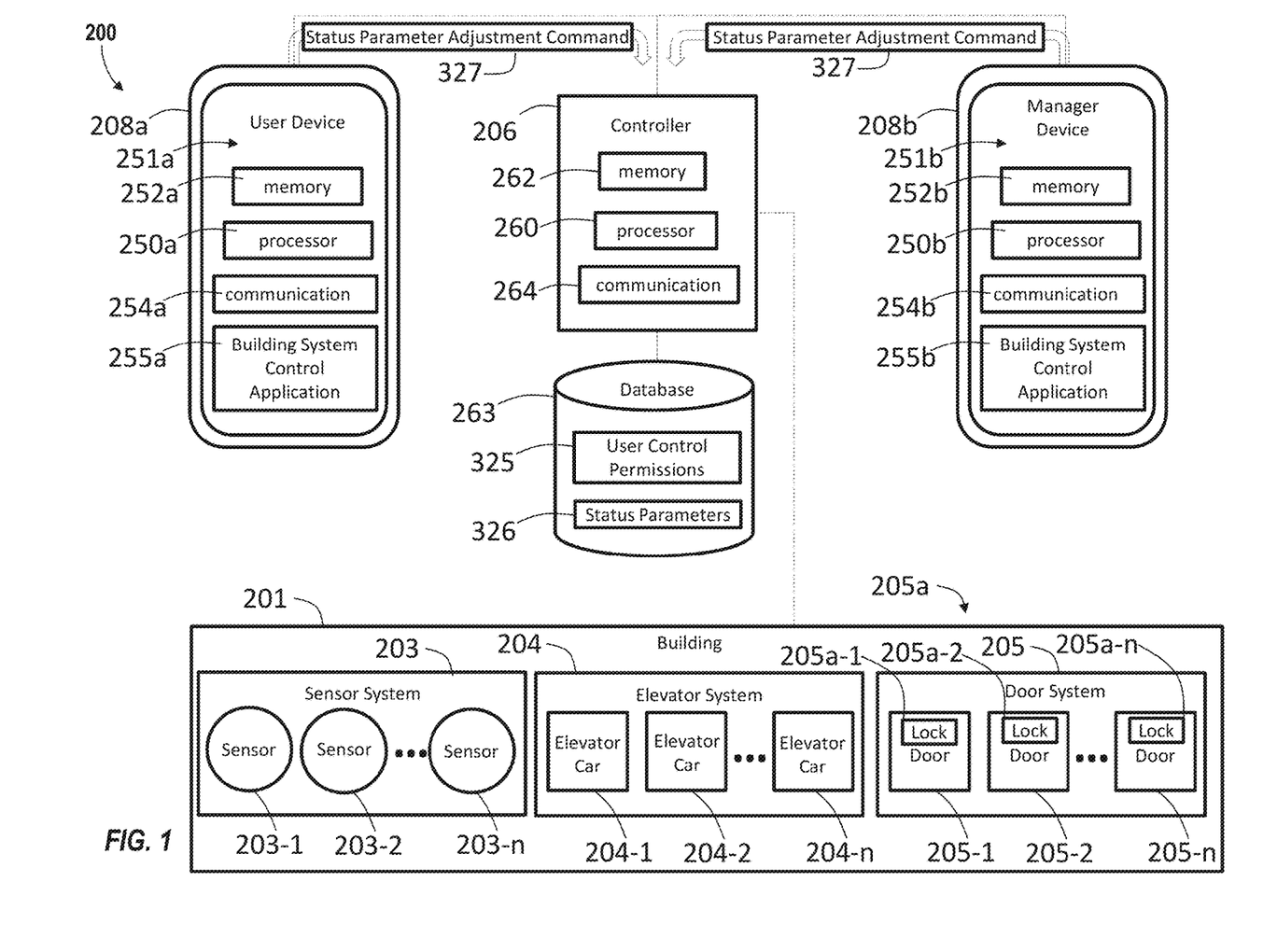
FIG. 1 illustrates a schematic view of a building control system, in accordance with an embodiment of the disclosure.

FIG. 1 depicts a building control system 200 in an example embodiment. The building control system 200 includes a door system 205 and an elevator system 204 installed at a building 201. The door system 205 and the elevator system 204 may collectively be referred to as building systems 204, 205. The disclosure is not intended to be limited by these building systems 204, 205 and as may be appreciated by one of skill in the art, the building 201 may include other systems not mentioned herein that may be controlled by the building control system 200. In some embodiments, the building 201 may be a building or a collection of buildings that may or may not be physically located near each other. The building 201 may include any number of floors. Persons entering the building 201 may enter at a lobby floor, or any other floor, and may go to a destination floor via one or more conveyance devices, such as the elevator system 204. Persons entering the building 201 may be required to enter a door (e.g., doors 205-1, 205-2 . . . 205-n) of the door system 205. The door (e.g., doors 205-1, 205-2 . . . 205-n) may include but is not limited to a door in a wall of the building, a door on the outside of the building, a garage door, and a parking lot access gate.

The building systems 204, 205 may be operably connected to one or more computing devices, such as a controller 206. The controller 206 may be configured to control dispatching operations for one or more elevator cars (e.g., elevator cars 204-1, 204-2, . . . 204-n) associated with the elevator system 204. The controller 206 may also be configured to control access to the one or more elevator cars (e.g., elevator cars 204-1, 204-2, . . . 204-n) associated with the elevator system 204. It is understood that the elevator system 204 may utilize more than one controller 206, and that each controller may control a group of elevators cars 204-1 and 204-2. Although two elevator cars 204-1 and 204-2 are shown in FIG. 1, it is understood that any number of elevators cars 204-n may be used in the elevator system 204. The elevator cars 204-1 and 204-2 may be located in the same hoistway or in different hoistways so as to allow coordination amongst elevator cars 204-1 and 204-2 in different elevator banks serving different floors. It is understood that other components of the elevator system 204 (e.g., elevator door, drive, counterweight, safeties, etc.) are not depicted for ease of illustration.

Further, the controller 206 may also be configured to control access to one or more doors (e.g., doors 205-1, 205-2, . . . 205-n). It is understood that the door system 205 may utilize more than one controller 206, and that each controller may control a group of doors 205-1 and 205-2. Although two doors 205-1 and 205-2 are shown in FIG. 1, it is understood that any number of elevators cars 205-n may be used in the door system 205. Each door includes a door lock 205a (e.g., door locks 205a-1, 205a-2 . . . 205a-n), as shown in FIG. 1. It is understood that other components of the door system 205 are not depicted for ease of illustration.

The controller 206 may include a processor 260, memory 262 and communication module 264 as shown in FIG. 1. The processor 260 can be any type or combination of computer processors, such as a microprocessor, microcontroller, digital signal processor, application specific integrated circuit, programmable logic device, and/or field programmable gate array. The memory 262 is an example of a non-transitory computer readable storage medium tangibly embodied in the controller 206 including executable instructions stored therein, for instance, as firmware. The communication module 264 may implement one or more communication protocols as described in further detail herein.

The building control system 200 may also include a sensor system 203 having one or more sensors (e.g., 203-1, 203-2, . . . 203-n). The controller 206 is coupled to the sensor system 203. Although two sensors 203-1 and 203-2 are shown in FIG. 1, it is understood that any number of sensors 203-n may be used in the sensor system 203. The sensor system 203 may include a variety of different types of sensors (e.g., 203-1, 203-2, . . . 203-n). The sensor system 203 captures status parameters 326 of the elevator system 204 and the door system 205. The status parameters 326 may indicate operational data of the elevator system 204, such as for example, elevator door position(e.g. open/closed), elevator car location, speed, voltage, vibration, acceleration, noise, deceleration, jerk, and any other performance parameter of any component of the elevator system 204 known to one of skill in the art. The status parameters 326 may indicate a status of the door system 205, such as for example, door position (e.g. open/closed/ajar) and door lock position (engaged/disengaged).

Other sensors (e.g., 203-1, 203-2, . . . 203-n) in the sensor system 203 may include cameras, people counters, microphones, etc. to capture information relevant to the usage of the elevator system 204. Thus, the type and nature of sensors (e.g., 203-1, 203-2, . . . 203-n) within the sensor system 203 is not limited to the embodiments disclosed herein. The sensor system 203 collects status parameters 326 regarding each elevator car (e.g., 204-1, 204-2, . . . 204-n) and door system 205 that may be stored in a database 263.

Also shown in FIG. 1 is a user device 208a. The user device 208a may be a computing device such as a desktop computer. The user device 208a may also be a mobile computing device that is typically carried by a person, such as, for example a phone, PDA, smart watch, tablet, laptop, etc. The user device 208a may have a touch screen 251a to allow user input. The user device 208a may include a processor 250a, memory 252a and communication module 254a as shown in FIG. 1. The processor 250a can be any type or combination of computer processors, such as a microprocessor, microcontroller, digital signal processor, application specific integrated circuit, programmable logic device, and/or field programmable gate array. The memory 252a is an example of a non-transitory computer readable storage medium tangibly embodied in the user device 208a including executable instructions stored therein, for instance, as firmware. The communication module 254a may implement one or more communication protocols as described in further detail herein. In a non-limiting example user device 208a belongs to a resident or employee of the building 201 who currently has access to control at least one building system 204, 205 of the building 201. Each user may have specific user control permissions 325 granting each user the ability to control selected building systems 204, 205 through a building system control application 255a on the user device 208a belonging to the user. The database 263 may be operatively connected to the controller 206 or stored within the controller 206. In one embodiment, the database 263 may be stored offsite, remotely, or in the cloud.

Also shown in FIG. 1 is a manager device 208b. The manager device 208b may be a computing device such as a desktop computer. The manager device 208b may also be a mobile computing device that is typically carried by a person, such as, for example a phone, PDA, smart watch, tablet, laptop, etc. The manager device 208b may have a touch screen 251b to allow user input. The manager device 208b may include a processor 250b, memory 252b and communication module 254b as shown in FIG. 1. The processor 250b can be any type or combination of computer processors, such as a microprocessor, microcontroller, digital signal processor, application specific integrated circuit, programmable logic device, and/or field programmable gate array. The memory 252b is an example of a non-transitory computer readable storage medium tangibly embodied in the manager device 208b including executable instructions stored therein, for instance, as firmware. The communication module 254b may implement one or more communication protocols as described in further detail herein. A manager may have specific control permissions 325 granting the manager the ability to control selected building systems 204, 205 through a building system control application 255b on the manager device 208b belonging to the manager. The manager device 208b may belong to a manager of the building 202 and have superseding authority to the user device 208a in controlling building systems 204, 205.

The user device 208a and manager device 208b may both be referred to as a device 208 for ease of explanation. Each device 208 has a unique identification credential that identifies each device 208. The device 208 and the controller 206 communicate with one another. For example, the device 208 and the controller 206 may communicate with one another when proximate to one another (e.g., within a threshold distance). The device 208 and the controller 206 may communicate over a wireless network, such as 802.11x (WiFi), short-range radio (Bluetooth), cellular, satellite, etc. In some embodiments, the controller 206 may include, or be associated with (e.g., communicatively coupled to) a networked element, such as kiosk, beacon, hall call fixture, lantern, bridge, router, network node, door lock, elevator control panel, building intercom system, etc. The networked element may communicate with the device 208 using one or more communication protocols or standards. For example, the networked element may communicate with the device 208 using near field communications (NFC). In other embodiments, the controller 206 may establish communication with a device 208 that is outside of the building 202. This connection may be established with various technologies including GPS, triangulation, or signal strength detection, by way of non-limiting example. In example embodiments, the device 208 communicates with the controller 206 over multiple independent wired and/or wireless networks. Embodiments are intended to cover a wide variety of types of communication between the device 208 and controller 206, and embodiments are not limited to the examples provided in this disclosure. Communication between the device 208 and the controller 206 will allow the controller 206 to determine the location of the device 208 in relation to the elevator system 203 and/or the door system 205. An identification credential on the device 208 will identify each device 208 to the controller 206.

Embodiments generate a user interface on the device 208 through the building system control application 255a, 255b. The building system control application 255a, 255b may be used to view the status of building systems 204, 205 through the device 208. In a non-limiting example, one may use the building system control application 255a, 255b to check to see if a door is ajar, closed, or open. In a non-limiting example, a user may use the building system control application 255a, 255b to check to see if a door lock is engaged and/or disengaged. The building system control application 255a, 255b may also be used to adjust the building systems 204, 205 by sending a status parameter adjustment command 327, discussed further below.

Figure 2:
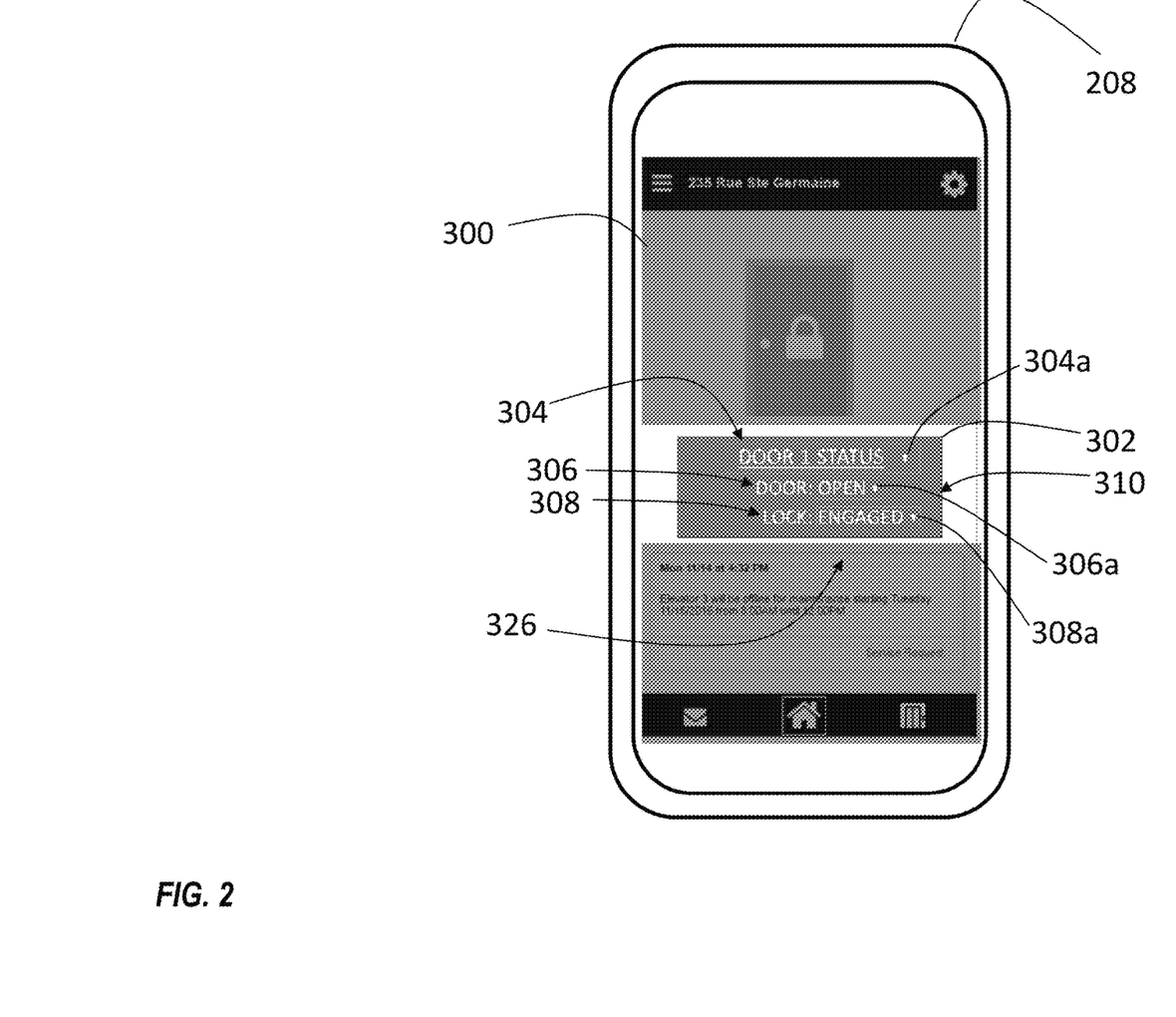
FIG. 2 depicts a user interface on a device, in accordance with an embodiment of the disclosure.
Figure 3:
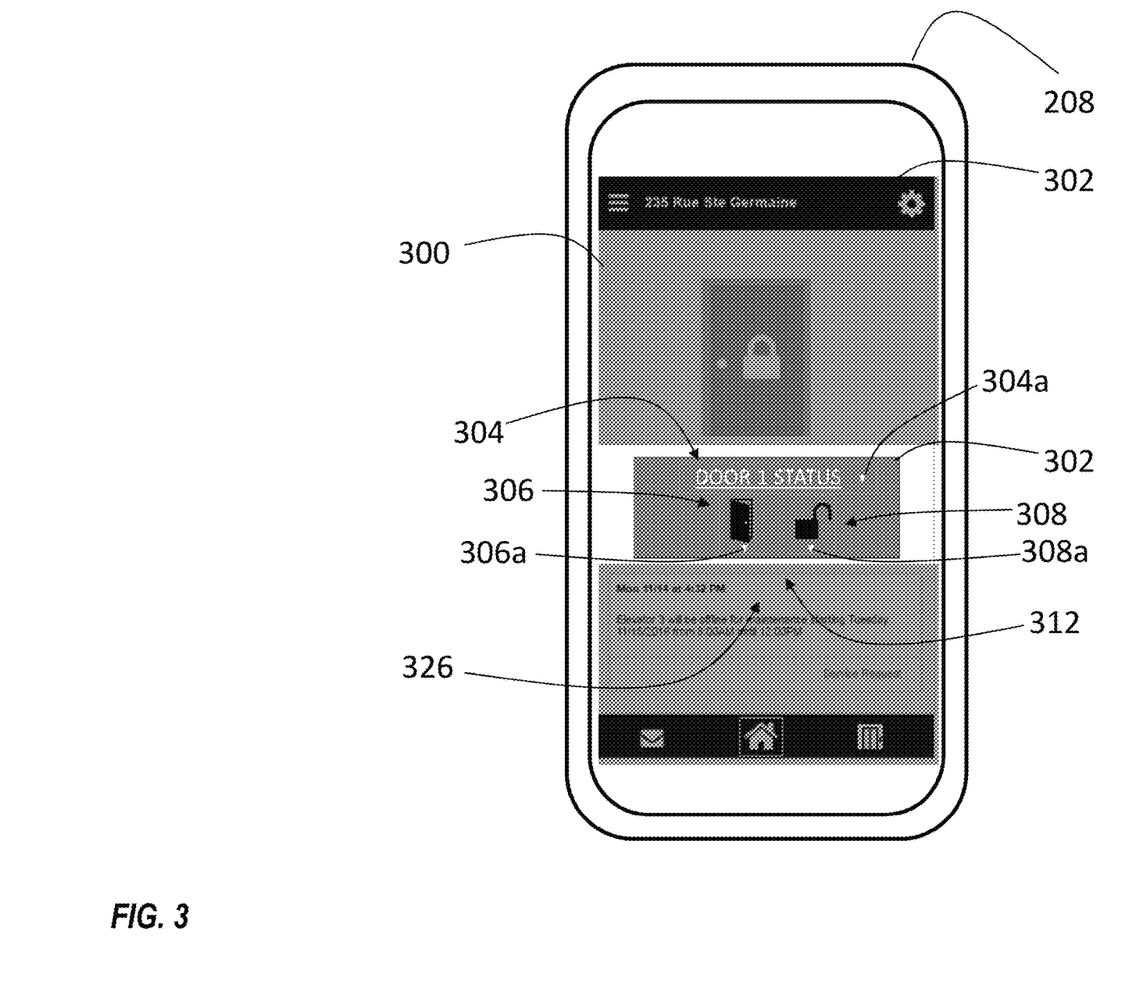
FIG. 3 depicts a user interface on a device, in accordance with an embodiment of the disclosure.
Figure 3A:
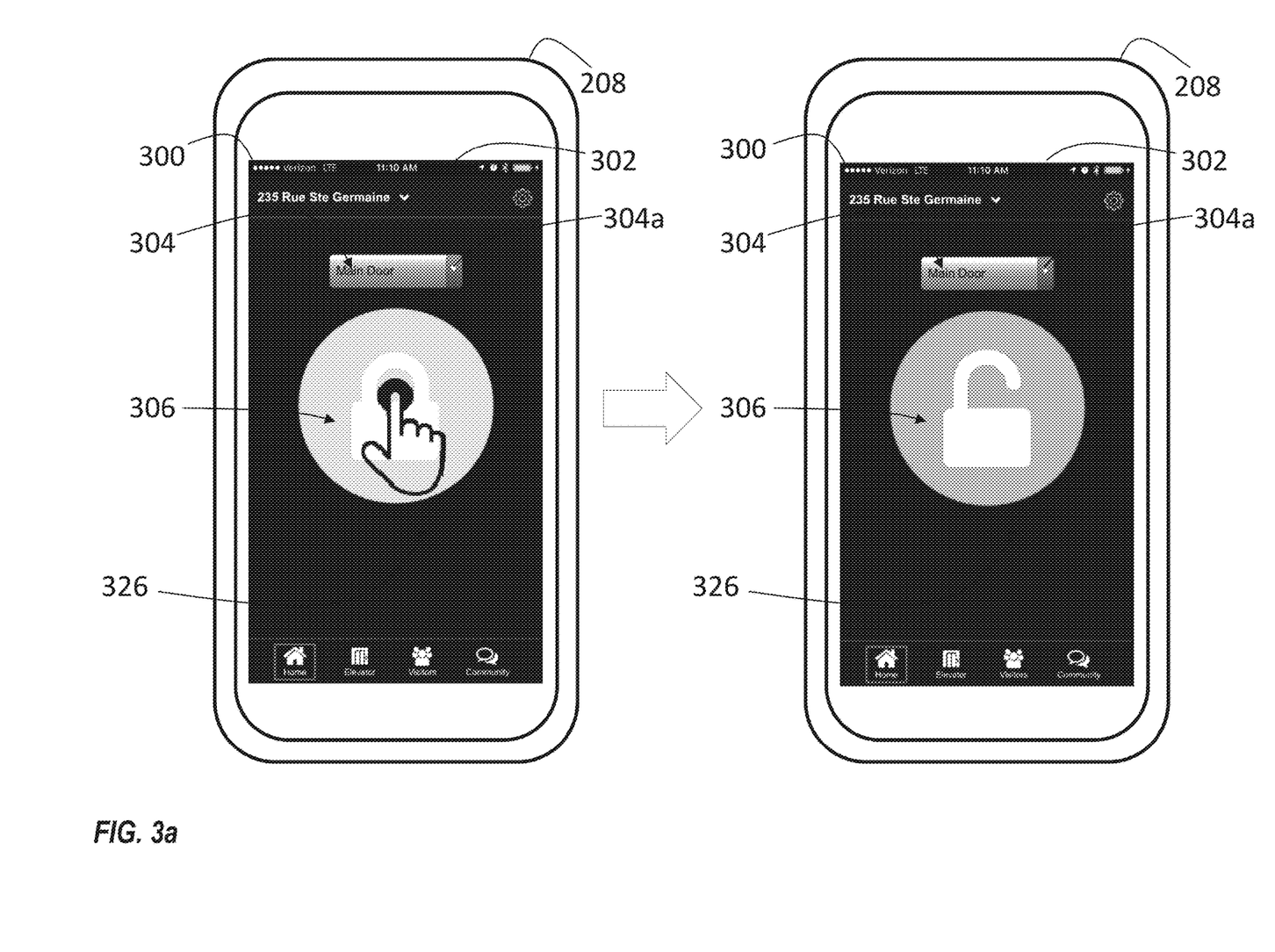
FIG. 3a depicts a user interface on a device, in accordance with an embodiment of the disclosure.

FIGS. 2-3 and 3a depict an example user interface 300 on a device 208. When the device 208 launches the building system control application 255a, 255b, a control screen 302 may be presented as shown in FIGS. 2 and 3. The control screen 302 may show a building system status button 304. The building system status button 304 may be adjustable to view the status of different building systems 204, 205. In a non-limiting embodiment, a different building system may be viewed by selecting a drop-down arrow 304a on the system status button 304. In the example of FIGS. 2 and 3, on the control screen 302 a status parameter 326 for a door is indicated on the building system status button 304 and may be seen at 306. On the control screen 302 a status parameter 326 for a lock on the door indicated on the building system status button 304 may be seen at 308. The status parameters 326 may be updated in real time. The status parameters 326 may be indicated by text 310 as seen in FIG. 2 and/or as a graphic 312 as seen in FIG. 3. In an example, the graphic 312 may be color-coded and appear green for locked, yellow for ajar, and red for open. The status parameters 326 may be indicated as a combination of color, text 310, and graphics 312. If a user and/or manager wishes to adjust the door through the device 208, the user and/or manager could select the drop down arrow 306a to adjust the door and then the controller 206 will adjust the door accordingly. If a user and/or manager wishes to adjust the door lock through the device 208, the user and/or manager could select the drop down arrow 308a and the controller 206 will adjust the door lock accordingly. It is understood, that a dropdown arrow 308a is shown for ease of explanation and that any other method of displaying a list of options or selection interfaces may be used. For example, another selection interface may include a pop-up/modal window with a list or grid of selections. The pop-up/modal window may be a new page state, such as a full-screen overlay. In another example, the selection interface may be a vertical or horizontal scrolling lightbox of selection options, it could be text, illustrations or photographs. The controller 206 may check the user controller permission 325 prior to making an adjustment to a door or lock because a user may not have been granted permission to adjust a selected door or a selected lock. As mentioned above, each user may have specific user control permissions 325 granting each user the ability to control selected building systems 204, 205 through a building system control application 255a on the user device 208a belonging to the user. For instance, a user may be able to control some doors and not others. FIG. 3a displays an example of a user interface 300 on the device 208, showing the control screen 302. Similar to FIGS. 2-3, FIG. 3a includes a building system status button 304 that may be adjustable to view the status of different building systems 204, 205 using a dropdown arrow 304a. Also seen in FIG. 3a is a status parameter 326 for a lock icon that may be seen at 306. The lock icon at 306, when pressed may change from a locked lock icon to an unlocked lock icon as displayed in the user interface 300, which also unlocks the lock on the main door indicated at 304.

Figure 4:
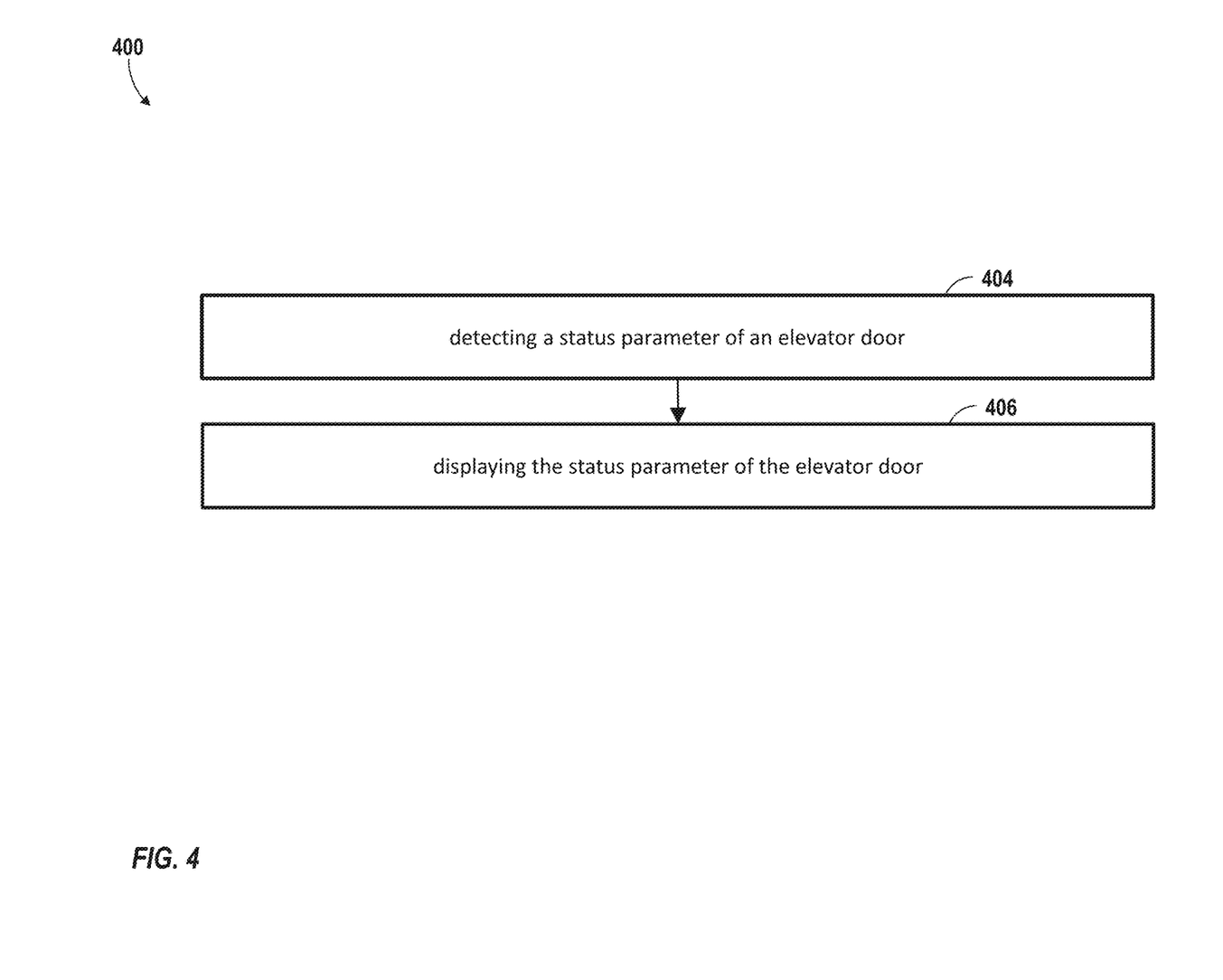
FIG. 4 is a flow diagram illustrating a method of controlling building systems, according to an embodiment of the present disclosure.

Referring now to FIG. 4, with continued reference to FIGS. 1-3 and 3a. FIG. 4 shows a flow chart of method 400 of controlling building systems, in accordance with an embodiment of the disclosure. At block 404, a status parameter 326 of an elevator door is detected and at block 406, the status parameter 326 of the elevator door is displayed on a device 208. As mentioned above, the status parameter 326 of a first door 205-1 is detected using the sensor system 203. The status parameter may indicated that the elevator door is open, closed, and/or locked. The method 400 may also include that a status parameter 326 of a first door 205-1 is detected. As mentioned above, the status parameter 326 of a first door 205-1 is detected using the sensor system 203. The method 400 may further include, a status parameter 326 of a first door lock 205a-1 is detected. As mentioned above, the status parameter 326 of a first door lock 205a-1 is detected using the sensor system 203. The first door lock 205a-1 is operably connected to the first door 205-1. The method 400 may also include that the status parameter 326 of the first door 205-1 is displayed on a device 208. At block 410, the status parameter 326 of the first door lock 205a-1 is displayed on the device 208. In an embodiment, the device 208 may be a mobile device as described above. In another embodiment, the status parameters 326 may be displayed as text and/or a graphic, as seen in FIGS. 2-3.

The method 400 may also include a user and/or manager transmitting a status parameter adjustment command 327 from the device 208. The status parameter adjustment command 327 may be for a door lock and/or a door. The controller 206 receives the status parameter adjustment command 327 and then responds by adjusting at least one of building system 204, 205. In one example, the controller 206 may engage and/or disengage a door lock in response to the status parameter adjustment command 327. In another example, the controller 206 may open and/or close a door in response to the status parameter adjustment command 327. Additionally, the method 400 may also include activating an alert in response to the at least one of the status parameter of a door and the status parameter of a door lock. The alert is activated on at least one of the user device 208a and a manager device 208b. The alert may be audible and/or visual. The alert may be activated when an error is detected, such as, for example, when the door is open and a lock on the open door is engaged. Further, a status parameter 326 may indicate that that a malfunctioning door may allow an intruder into the building, the controller 206 may take other actions in response to the status parameter 326 to limit where the intruder may enter once they pass through the malfunctioning door, such as for example deactivating an elevator car near the malfunctioning door and/or closing nearby doors and engaging the locks on the nearby doors. Alternatively, the controller 206 may determine to open doors and/or disengage locks in response to status parameters 326. For example, an elevator door may be closed in response to a first door 205-1 being open for a selected period of time. In another example, a second door 205-2 may be closed and the second lock 205a-2 may be locked in response to the first door 205-1 being open for a selected period of time. In another example, there may be a delay between when the first door 205-1 is closed and locked and the second door 205-2 is opened. In another example, an elevator car 204-1 may be locked down for a selected period of time if a first door 205-1 is unlocked. In another example, an elevator car 204-1 may not service a floor for a selected period of time on which a first door 205-1 is located if the door 205-1 is unlocked.

While the above description has described the flow process of FIG. 4 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of controlling a building control system comprising a door system and an elevator system using a sensor system configured to capture one or more status parameters of the elevator system and the door system, the method comprising:

detecting a status parameter of an elevator door of the elevator system, displaying the status parameter of the elevator door on a device;

detecting a status parameter of a first door of the door system, wherein the first door is a door within the building other than a landing door to the elevator car and the elevator door of the elevator car;

displaying the status parameter of the first door on the device detecting a status parameter of a first door lock, the first door lock being operably connected to the first door;

displaying the status parameter of the first door lock on the device, wherein the status parameter of the first door and the status parameter of the first door lock in combination indicate that the first door is malfunctioning, the first door is malfunctioning in response to the status parameter of the first door and the status parameter of the first door lock indicate that the first door lock on the first door is engaged and the first door is open;

closing the elevator door in response to the status parameter of the first door and the status parameter of the first door lock; and closing a second door in response to the status parameter of the first door and status parameter of the first door lock and allowing the second door to remain closed.

2. The method of claim 1, further comprising:
receiving a status parameter adjustment command for the first door lock; and
adjusting the first door lock in response to the status parameter adjustment command for the first door lock.

3. The method of claim 2, wherein the adjusting further comprises:
disengaging the first door lock.

4. The method of claim 3, further comprising:
receiving a status parameter adjustment command for the first door; and
adjusting the first door in response to the status parameter adjustment command for the first door.

5. The method of claim 4, wherein the adjusting the first door in response to the status parameter adjustment command for the first door further comprises:
closing the first door.

6. The method of claim 5, wherein the adjusting the first door lock in response to the status parameter adjustment command for the first door lock further comprises:
disengaging the first door lock in response to the status parameter adjustment command for the first door lock.

7. The method of claim 1, further comprising:
activating an alert in response to the status parameter of the first door and the status parameter of the first door lock, wherein the alert is activated on the device.

8. The method of claim 1, further comprising:
deactivating the elevator car of the elevator system in response to the status parameter of the first door and the status parameter of the first door lock.

9. The method of claim 1, further comprising:
engaging a second door lock in response to the status parameter of the first door and the status parameter of the first door lock, wherein the second door lock is operably connected to the second door.

10. The method of claim 1, further comprising:
disengaging a second door lock in response to the status parameter of the first door and the status parameter of the first door lock, wherein the second door lock is operably connected to a second door.

11. The method of claim 1, wherein:
the status parameter of the first door and the status parameter of the first door lock displays as at least one of text and a graphic.

12. A controller of a building control system comprising a door system and an elevator system using a sensor system configured to capture one or more status parameters of the elevator system and the door system, the controller comprising:
a processor;
a memory comprising computer-executable instructions that, when executed by the processor, cause the processor to perform operations, the operations comprising:
detecting a status parameter of an elevator door of the elevator system,
displaying the status parameter of the elevator door on a device;
detecting a status parameter of a first door of the door system, wherein the first door is a door within the building other than a landing door to the elevator car and the elevator door of the elevator car;
displaying the status parameter of the first door on the device;
detecting a status parameter of a first door lock of the door system, the first door lock being operably connected to the first door;
displaying the status parameter of the first door lock on the device,
wherein the status parameter of the first door and the status parameter of the first door lock in combination indicate that the first door is malfunctioning, the first door is malfunctioning in response to the status parameter of the first door and the status parameter of the first door lock indicate that the first door lock on the first door is engaged when the first door is open;
closing the elevator door in response to the status parameter of the first door and the status parameter of the first door lock; and
closing a second door in response to the status parameter of the first door and status parameter of the first door lock and allowing the second door to remain closed.

13. The method of claim 1, further comprising:
preventing an elevator car from servicing a floor for a selected period of time, the first door lock being located on said floor.

14. A method of controlling a building control system comprising a door system and an elevator system using a sensor system configured to capture one or more status parameters of the elevator system and the door system, the method comprising:
detecting a status parameter of an elevator door of the elevator system,
displaying the status parameter of the elevator door on a device;
detecting a status parameter of a first door of the door system, wherein the first door is a door within the building other than a landing door to the elevator car and the elevator door of the elevator car;
displaying the status parameter of the first door on the device;
detecting a status parameter of a first door lock operably connected to the first door,
displaying the status parameter of the first door lock on the device;
wherein the status parameter of the first door and the status parameter of the first door lock indicate that the first door is malfunctioning, the first door is malfunctioning in response to the status parameter of the first door and the status parameter of the first door lock indicate that the first door lock on the first door is engaged and the first door is open; and adjusting operation of the elevator system in response to the first door that is malfunctioning wherein the adjusting operation further comprises at least one of:

deactivating an elevator car of the elevator system;

closing the elevator door of an elevator car of the elevator system; and preventing an elevator car from servicing a floor for a selected period of time, the first door lock being located on said floor; and closing a second door in response to the status parameter of the first door and status parameter of the first door lock and allowing the second door to remain closed.

\* \* \* \* \*